(12) United States Patent
Omata et al.

(10) Patent No.: US 9,276,517 B2
(45) Date of Patent: Mar. 1, 2016

(54) CONTROL DEVICE OF AC MOTOR

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 3 days.

(21) Appl. No.: 14/174,193

(22) Filed: Feb. 6, 2014

(65) Prior Publication Data
US 2014/0225539 A1    Aug. 14, 2014

(30) Foreign Application Priority Data
Feb. 8, 2013    (JP) .................................. 2013-23254

(51) Int. Cl.
H02P 21/00    (2006.01)
H02P 29/02    (2006.01)
H02P 21/06    (2006.01)

(52) U.S. Cl.
CPC ............ H02P 29/027 (2013.01); H02P 29/023 (2013.01); *H02P 21/0035* (2013.01); *H02P 21/06* (2013.01)

(58) Field of Classification Search
CPC ... H02P 21/0035; H02P 21/06; H02P 21/146; H02P 2207/05; Y02T 10/643
USPC .................................................... 318/400.02
See application file for complete search history.

(56) References Cited

U.S. PATENT DOCUMENTS

2008/0079385 A1    4/2008   Hashimoto et al.
2011/0025238 A1*   2/2011   Ueda et al. ............... 318/400.02

FOREIGN PATENT DOCUMENTS

| JP | H05-260761 | 10/1993 |
| JP | 2003-009573 | 1/2003 |
| JP | 2003009573 A * | 1/2003 |
| JP | 2004-159391 | 6/2004 |
| JP | 2007-159354 | 6/2007 |
| JP | 2007159354 A * | 6/2007 |
| JP | 2007-215306 | 8/2007 |
| JP | 2007215306 A * | 8/2007 |

OTHER PUBLICATIONS

Office Action (2 pages) dated Feb. 5, 2015, issued in corresponding Japanese Application No. 2013-023254 and English translation (4 pages).
Office Action (2 pages) dated Sep. 15, 2015, issued in corresponding Japanese Application No. 2013-023254 and English translation (3 pages).
Omata, et al., U.S. Appl. No. 14/174,102, filed Feb. 6, 2014.
Omata, et al., U.S. Appl. No. 14/174,147, filed Feb. 6, 2014.
Omata, et al., U.S. Appl. No. 14/174,159, filed Feb. 6, 2014.
Omata, et al., U.S. Appl. No. 14/174,161, filed Feb. 6, 2014.
Omata, et al., U.S. Appl. No. 14/174,200, filed Feb. 6, 2014.
Omata, et al., U.S. Appl. No. 14/174,213, filed Feb. 6, 2014.
Omata, et al., U.S. Appl. No. 14/174,515, filed Feb. 6, 2014.

* cited by examiner

*Primary Examiner* — Kawing Chan
*Assistant Examiner* — Bradley Brown
(74) *Attorney, Agent, or Firm* — Nixon & Vanderhye PC

(57) ABSTRACT

A control device of a three phase AC motor includes: an inverter for driving the motor; a current sensor for sensing current in a sensor phase of the motor; and a controller for switching multiple switching elements in the inverter to control the current of the motor. The controller includes: a revolution number calculation device for calculating the revolution number of the motor; a three-phase voltage command operation device for operating three phase voltage commands to be applied to the motor based on a current command and an electric angle; and a current concentration determination device for determining whether a current concentration is caused based on the three phase voltage commands when the revolution number is not more than a predetermined revolution number. In the current concentration, current not less than a predetermined threshold value flows continuously for a predetermined period in one or more phases of the inverter.

1 Claim, 10 Drawing Sheets

CONTROL DEVICE OF AC MOTOR

CROSS REFERENCE TO RELATED APPLICATION

This application is based on Japanese Patent Application No. 2013-23254 filed on Feb. 8, 2013, the disclosure of which is incorporated herein by reference.

TECHNICAL FIELD

The present disclosure relates to a control device of an AC motor, the control device sensing a phase current of one of three phases by a current sensor and controlling current flowing through the AC motor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and a DC voltage of the DC power source is converted into an AC voltage by the inverter to thereby drive the AC motor.

In the control device of the AC motor mounted in this kind of hybrid automobile and electric automobile, there has been known a technique of "one phase control" in which a current sensor for sensing a phase current is provided in one phase and in which current estimated values based on current sensed value of the one phase are fed back, whereby current flowing through the AC motor is controlled (for example, see patent document 1). According to the technique, the current sensor is provided only in the one phase, so that the number of current sensors is reduced and hence a construction near three phase output terminals of an inverter can be reduced in size and the control system of the AC motor can be reduced in cost.

On the other hand, there has been known a technique of "current concentration determination" for protecting an inverter for driving an AC motor from an overload state. For example, according to the technique disclosed in a patent document 2, whether or not an overload current flows is determined by sensing an output current of an inverter, and when it is determined that an overload current flows, a period of time in which a state continues in which the overload current flows is counted. Then, when the period of time in which the state continues in which the overload current flows is more than a given period of time, it is determined that the inverter is in an overload state.

When the number of revolutions of an AC motor is not more than a given number of revolutions, that is, is close to a state in which the AC motor is stopped, a time change in a phase current becomes small, whereby there is brought about a state in which the phase current is made constant, that is, "a direct current". Then, a current value is fixed for each phase according to an electric angle at a position in which the AC motor is stopped and a current command phase. As a result, when a state in which the current of a specific phase is more than a given threshold value continues for a given period, it is called that "a current concentration is caused". In the phase in which the current concentration is caused, the switching elements and the like of an inverter are likely to be brought into an overload state.

In the construction in which the current sensors are provided in two phases or three phases to thereby directly sense the currents of the respective phases, it can be easily determined whether or not the current concentration is caused in each phase. On the other hand, in the construction in which the current sensor is provided only in one phase, the current values of the other two phases cannot be directly sensed, in order to determine whether or not the current concentration is caused, it is important to appropriately estimate the currents of the other two phases other than a sensor phase or to replace the currents by other values equivalent to the currents.

In particular, a difficulty is presented when the current sensed value of the sensor phase becomes "zero" according to an electric angle of the position in which the AC motor is stopped and a current command phase. For example, in the technique of the patent document 1, when the sine value of a current reference angle ($\theta'$) of the sensor phase is not zero and in which the AC motor is stopped at the position in which the current sensed value of the sensor phase becomes zero, it is estimated that both of the current estimated values of the other two phases are zero. Further, when the sine value of the current reference angle ($\theta'$) of the sensor phase is zero and when the current sensed value of the sensor phase becomes zero, it is impossible to calculate the current estimated values of the other two phases. Hence, even when the current concentration is caused in any one of the other two phases, it cannot be determined whether or not the current concentration is caused. Moreover, in the first place, in the technique of the related art, it is not taken into account to determine whether or not the current concentration is caused on the basis of the current sensed value of the sensor phase of one phase.

[Patent Document 1] JP-A No. 2004-159391
[Patent Document 2] JP-A Hei 5-260761

SUMMARY

It is an object of the present disclosure to provide a control device of an AC motor that senses current flowing in a sensor phase that is one of three phases and that determines whether a current concentration is caused when the number of revolutions of the AC motor is not more than a given number of revolutions.

According to an aspect of the present disclosure, a control device of a three phase alternating current motor includes: an inverter for driving the motor; a current sensor for sensing current flowing in a sensor phase of the motor, which is one of three phases of the motor; and a controller for switching on and off a plurality of switching elements, which provide the inverter, so that the controller controls the current flowing through the motor. The controller includes: a revolution number calculation device for calculating the number of revolutions of the motor; a three-phase voltage command operation device for operating three voltage commands for three phase voltages of the three phases to be applied to the motor based on a current command and an electric angle; and a current concentration determination device for determining whether a current concentration is caused based on the three voltage commands when the number of revolutions acquired by the revolution number calculation device is not more than a predetermined number of revolutions. The current concentration is a state, in which current not less than a predetermined threshold value flows continuously for a predetermined period in one or more phases of the inverter.

According to the above control device, when the number of revolutions is not more than the given number of revolutions, whether or not a current concentration is caused in each phase can be appropriately determined by the current concentration determination device on the basis of the three phase voltage commands operated by the three phase voltage command operation device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of a control device of an AC motor according to the present disclosure will be described on the basis of the drawings. First, a construction common to a plurality of embodiments will be described with reference to FIG. 1 and FIG. 2. An electric motor control device 10 as "a control device of an AC motor" according to this embodiment is applied to an electric motor drive system for driving a hybrid automobile.

[Construction of the Control Device of the AC Motor]

Figure 1:
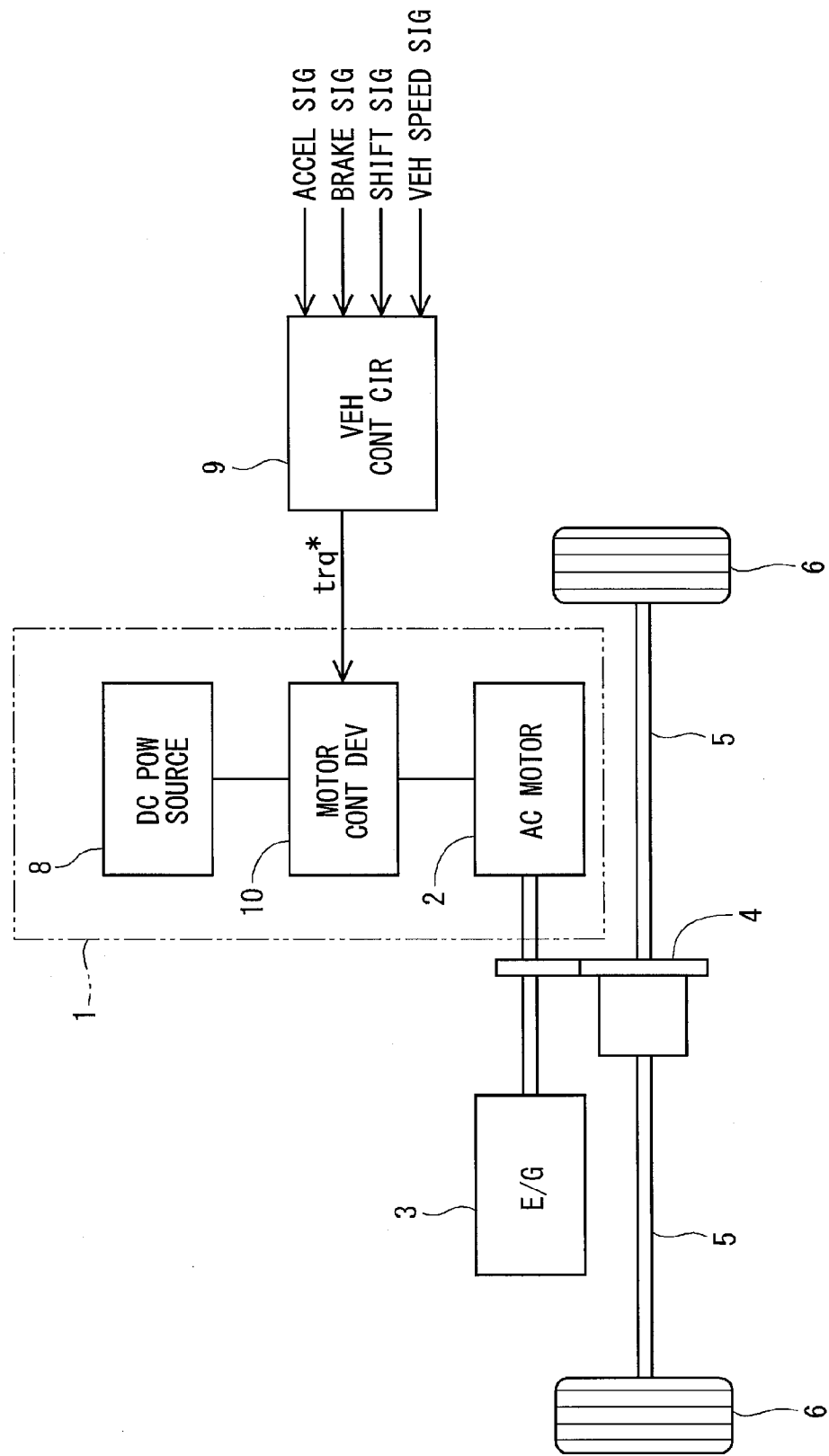
FIG. 1 is a diagram to show a construction of an electric motor drive system to which a control device of an AC motor according to a first embodiment or a second embodiment of the present disclosure is applied.

As shown in FIG. 1, the electric motor drive system 1 includes an AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three phase AC motor of a permanent magnet synchronous type.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator (designated by "MG" in the drawing) having a function as an electric motor that generates torque for driving the driving wheels 6 and a function as a generator that is driven by the kinetic energy of the vehicle, which is transmitted from the engine 3 and the driving wheels 6, and that can generate electricity.

The AC motor 2 is coupled to an axle 5 via a gear 4, for example, a transmission or the like. In this way, the driving force of the AC motor 2 rotates the axle 5 via the gear 4 to thereby drive the driving wheels 6.

The DC power source 8 is an electricity storage device that can charge and discharge electricity, for example, a secondary battery such as a nickel metal hydride battery or a lithium ion battery, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided therein with a CPU, a ROM, an I/O, and a bass line for connecting these elements, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. Further, the vehicle control circuit 9 detects a driving state of the vehicle on the basis of these acquired signals and outputs a torque command value trq* responsive to the driving state to the electric motor control device 10. Further, the vehicle control circuit 9 outputs a command signal to an engine control circuit (not shown) for controlling the drive of the engine 3.

Figure 2:
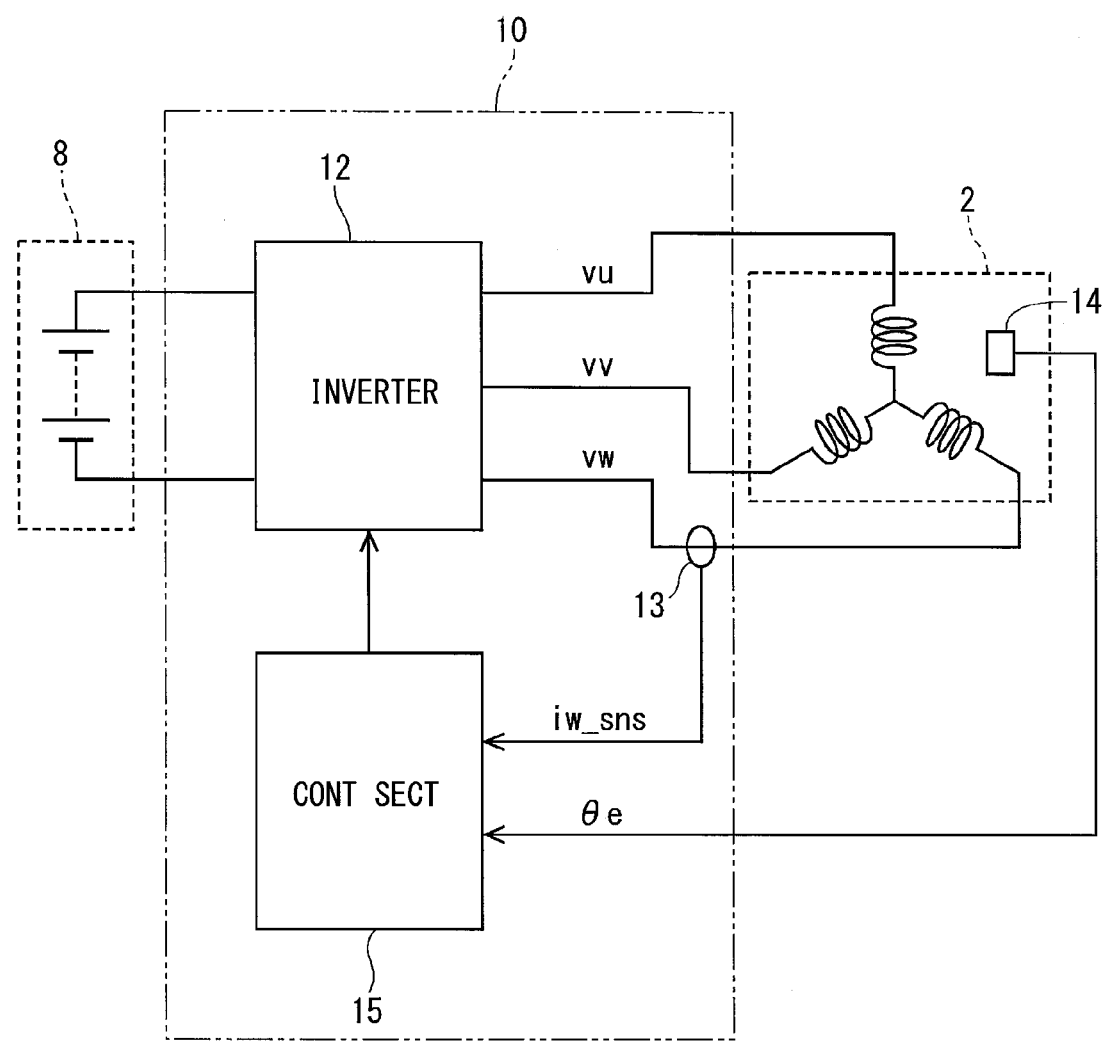
FIG. 2 is a general construction diagram of the control device of the AC motor according to the first embodiment or the second embodiment of the present disclosure.

As shown in FIG. 2, the electric motor control device 10 includes the inverter 12, a current sensor 13, and a control section 15 as "a controller".

The inverter 12 has voltage impressed thereon as an inverter input voltage VH, the voltage being voltage to which DC voltage of the DC power source 8 is boosted by a boost converter (not shown). The inverter 12 has six switching elements (not shown) connected in a bridge mode. As to the switching element, for example, an IGBT (Insulated Gate Bipolar Transistor), a MOS (Metal Oxide Semiconductor) transistor, and a bipolar transistor can be used for the switching element. The switching elements are switched on and off on the basis of PWM signals UU, UL, VU, VL, WU, WL outputted from a PWM signal generation part 25 of the control section 15. In this way, the inverter 12 controls three phase AC voltages vu, vv, vw to be impressed on the AC motor 2. When the AC motor 2 has the three phase AC voltages vu, w, vw, which are generated by the inverter 12, impressed thereon, the AC motor 2 has its drive controlled.

The current sensor 13 is provided in any one phase of the AC motor 2. A phase having the current sensor 13 provided therein is referred to as "a sensor phase". The current sensor 13 senses a phase current of the sensor phase and outputs a current sensed value to the control section 15. "The current sensed value of the sensor phase" is referred to as "a sensor value", as required.

In the present embodiment, descriptions will be made on the assumption of a construction in which the current sensor 13 is provided in a W phase. That is, "a W phase" is the same meaning as "the sensor phase". In this regard, in the other embodiment, a U phase or a V phase may be the sensor phase.

A rotation angle sensor 14 is provided near a rotor (not shown) of the AC motor 2 and senses an electric angle θe and outputs a sensed electric angle θe to the control section 15. Moreover, the number of revolutions N of the rotor of the AC motor 2 is calculated on the basis of the electric angle θe sensed by the rotation angle sensor 14. Hereinafter, "the number of revolutions N of the rotor of the AC motor 2" is simply referred to as "the number of revolutions N of the AC motor 2".

The rotation angle sensor 14 of the present embodiment is a resolver, but in the other embodiment, the rotation angle sensor 14 may be another kind of sensor, for example, a rotary encoder.

The control section 15 is constructed of a microcomputer and the like and is provided therein with a CPU, a ROM, an I/O, and a bass line for connecting these elements, all of which are not shown in the drawings. The control section 15 controls the movement of the AC motor 2 by software processing, which is performed by executing previously stored programs by the CPU, and by hardware processing, which is performed by a dedicated electronic circuit.

According to the number of revolutions N of the AC motor 2 based on the electric angle θe sensed by the rotation angle sensor 14 and a torque command value trq* from the vehicle control circuit 9, the electric motor control device 10 drives the AC motor 2 as an electric motor to make the AC motor 2 perform a powering operation, whereby the AC motor 2 consumes electricity, or drives the AC motor 2 as a generator to make the AC motor 2 perform a regenerating operation, whereby the AC motor generates electricity. Specifically, according to the number of revolutions N and whether the torque command value trq* is plus or minus, the electric motor control device 10 switches the movement of the AC motor 2 into the following four patterns:

<1. Normal rotation/powering operation> when the number of revolutions N is plus and the torque command value trq* is plus, the AC motor 2 consumes electricity;

<2. Normal rotation/regenerating operation> when the number of revolutions N is plus and the torque command value trq* is minus, the AC motor 2 generates electricity;

<3. Reverse rotation/powering operation> when the number of revolutions N is minus and the torque command value trq* is minus, the AC motor 2 consumes electricity; and <4. Reverse rotation/regenerating operation> when the number of revolutions N is minus and the torque command value trq* is plus, the AC motor 2 generates electricity.

When the number of revolutions N>0 (normal rotation) and the torque command value trq*>0, or the number of revolutions N<0 (reverse rotation) and the torque command value trq*<0, the inverter 12 converts the DC electricity supplied from the DC power source 8 to an AC electricity by the switching operation of the switching elements and supplies the AC electricity to the AC motor 2, thereby driving the AC motor 2 in such a way as to output torque (to perform a powering operation).

On the other hand, when the number of revolutions N>0 (normal rotation) and the torque command value trq*<0, or the number of revolutions N<0 (reverse rotation) and the torque command value trq*>0, the inverter 12 converts the AC electricity generated by the AC motor 2 to a DC electricity by the switching operation of the switching elements and supplies the DC electricity to the DC power source 8, whereby the AC motor 2 performs a regenerating operation.

In the embodiments of the present disclosure, the current sensor 13 is provided in only one phase. Hence, as compared with a construction in which the current sensors are provided in two phases or three phases, the number of current sensors can be reduced and a construction near three phase output terminals of the inverter 12 can be reduced in size and the control system of the AC motor 2 can be reduced in cost.

On the other hand, when current to be passed through the AC motor 2 is controlled, it is necessary to perform "a one-phase control" based on the sensor value of the one phase. Although several methods are proposed for the one-phase control, in any method, actual machine information tends to be scarce as compared with a two-phase control based on the sensor values of two phases.

Difficulties of the one-phase control at the time of low rotation will be described with reference to FIGS. 3A, 3B, 3C and FIGS. 4A, 4B.

Figure 3A:
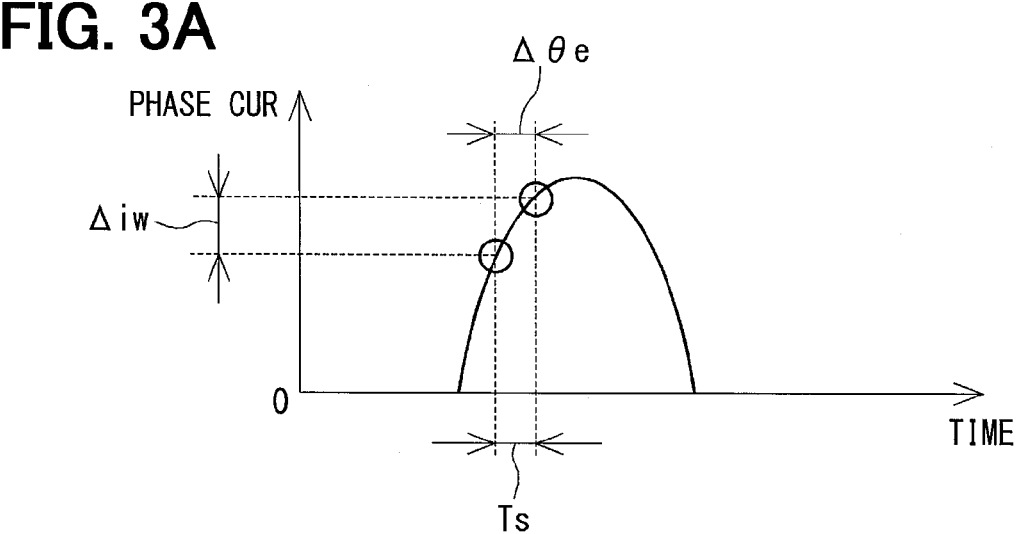
FIGS. 3A, 3B, and 3C are schematic charts of a phase current waveform to illustrate a difficulty of a one-phase control when an AC motor is rotated at a low rotation.
Figure 3B:
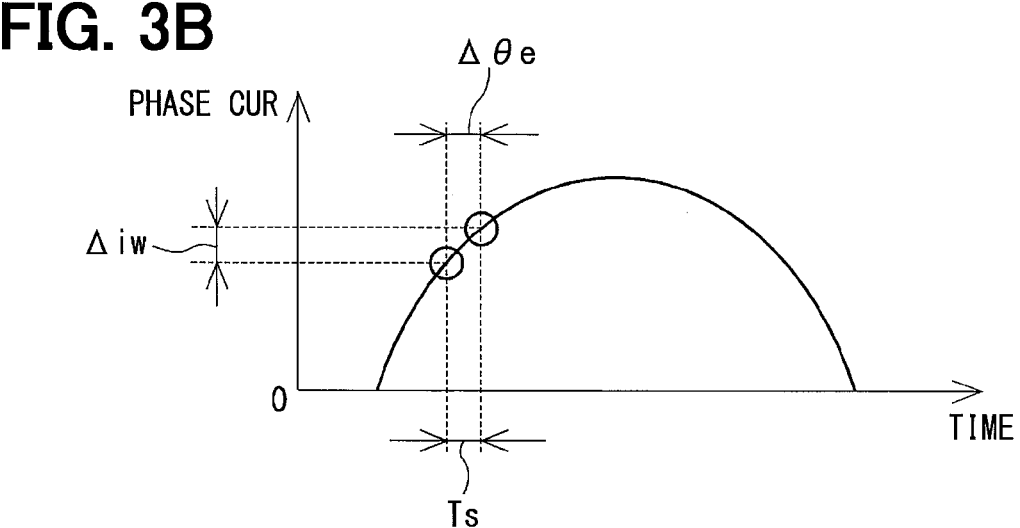
Figure 3C:
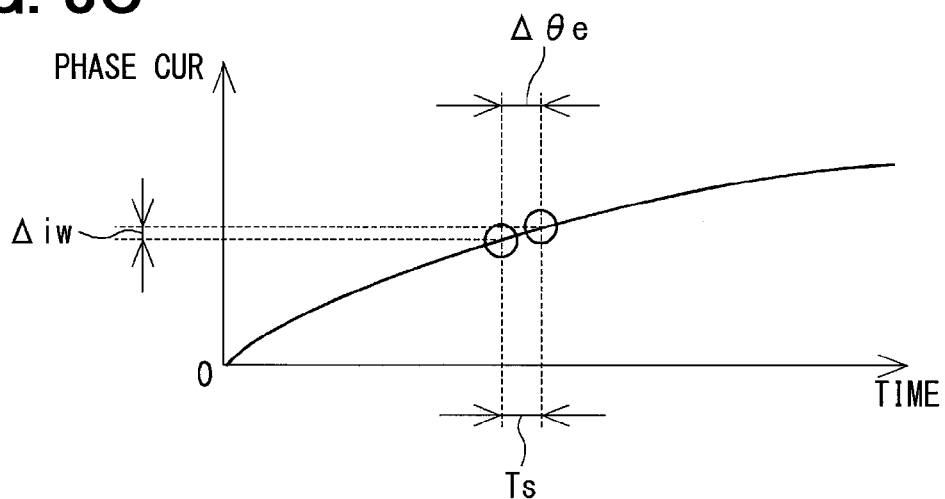

FIGS. 3A, 3B, 3C are charts to schematically show the relationship between the sampling interval Ts of the current sensor 13 and an electric angle movement Δθe and a current change Δiw of a W phase current waveform for cases where the number of revolutions N is different. FIGS. 3A, 3B, 3C show phase current waveforms at the time of high rotation, middle rotation, and low rotation, respectively. Here, each of "the high rotation, the middle rotation, and the low rotation" is used only in a relative meaning and does not mean a specific number of revolutions. Moreover, the sampling interval Ts is assumed to be constant irrespective of the number of revolutions N.

At the time of the high rotation, an electric angle movement Δθe and a current change Δiw are comparatively large values and hence have actual machine information well reflected thereon, which hence makes it possible to perform the one-phase control of comparatively high accuracy.

At the time of the middle rotation, the electric angle movement Δθe and the current change Δiw at the sampling interval Ts are further decreased than at the time of the high rotation and hence are rather scarce of the actual machine information, which hence reduces the accuracy of the one-phase control.

At the time of the low rotation, the electric angle movement Δθe and the current change Δiw are still further decreased and hence the current change Δiw becomes close to zero. For this reason, the actual machine information becomes scarcer, so that in the one-phase control, the drive control of the AC motor 2 is made unstable.

Further, let's assume a state in which the AC motor 2 is stopped. Hereinafter, a term of "stop" includes not only a case in which the number of revolutions N is rigidly 0 [rpm] but also a low rotation state in which the number of revolutions N is not more than a given number of revolutions. In a stop state, the electric angle θe becomes nearly constant and an electric angular velocity ω nearly becomes 0 [rad/s].

Figure 4A:
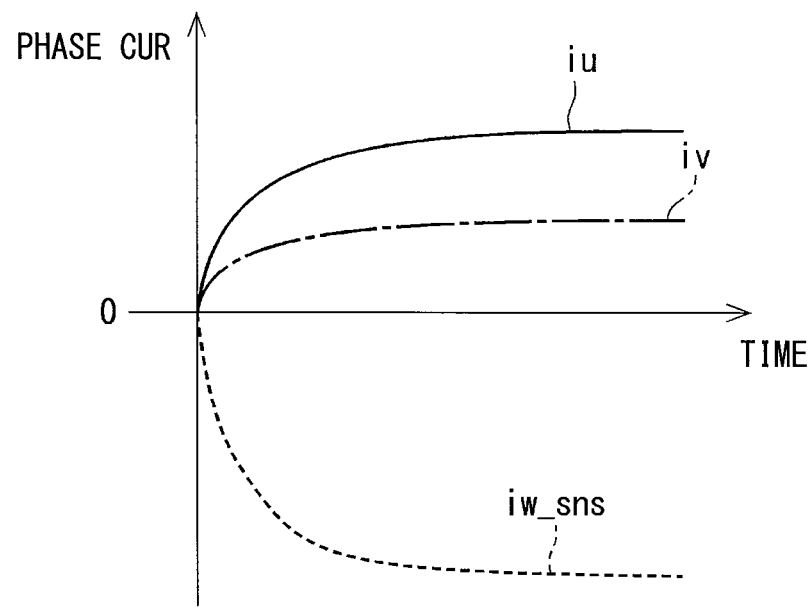
FIGS. 4A, and 4B are schematic charts to illustrate a state in which a phase current when the AC motor is stopped is made a direct current.

When it is assumed that also a current command phase φ is constant in this stop state, as shown in FIG. 4A, the currents of the respective phases become constant, that is, are made direct currents. In FIG. 4A, a U phase current iu and a V phase current iv show actual currents and actually are not sensed. As to the W phase, the current sensed value iw_sns is shown. In this regard, an equation (1) holds true for the phase currents of three phases from the Kirchhoff's law.

$$iu+iv+iw=0 \quad (1)$$

When the number of revolutions N of the AC motor 2 is not less than a given number of revolutions, the currents of the respective phases are temporally varied in the shape of a sine waveform and are averaged between the phases. That is, as far as an abnormality is not caused in the circuit elements of the inverter 12 and in the windings of the AC motor 2, the current does not flow in a specific phase in a concentrated manner.

However, when the AC motor 2 is stopped or in a state in which the AC motor is close to stop, the phase current is made a direct current and hence a current value is fixed for each phase according to the electric angle θe at the position in which the AC motor 2 is stopped and the current command phase ω. In the example shown in FIG. 4A, the absolute value of the W phase current iw_sns is larger than the absolute value of the U phase current iu and the absolute value of the V phase current iv. In this example, a state in which the W phase current iw_sns is more than a given threshold value continues for a given period is referred to as "a current concentration is caused". In a phase in which the current concentration is caused, the switching elements and the like of the inverter 12 are likely to be brought into an overload state.

Hence, in the construction in which the current sensors are provided in two phases or three phases and in which the currents of the respective phases are directly sensed, it can be easily determined whether or not the current concentration is caused. On the other hand, in the construction in which the current sensor 13 is provided only in one phase, in order to determine the current concentration, it is important to correctly estimate the current of two phases other than the sensor phase or to equivalently replace the current by other quantity.

Figure 4B:
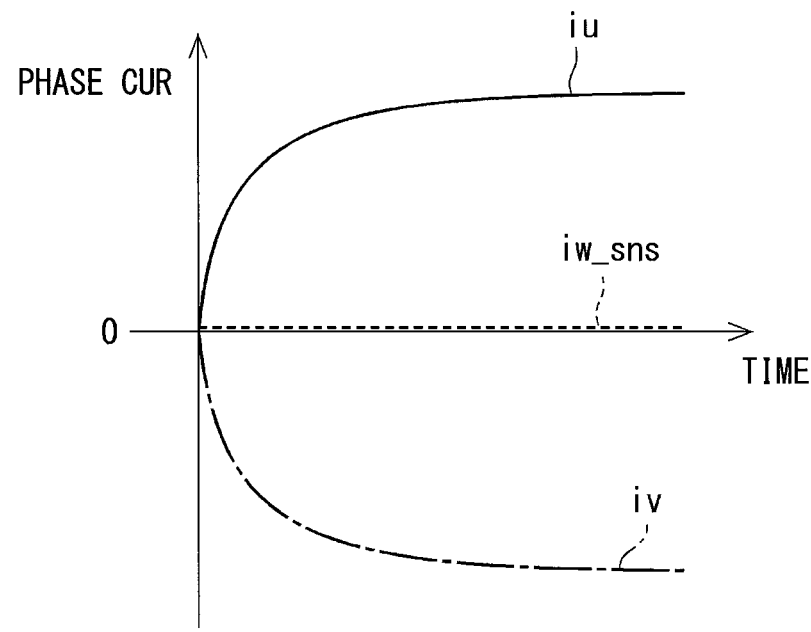

In particular, as shown in FIG. 4B, a difficulty is presented when the current sensed value iw_sns of the sensor phase becomes "zero" according to the electric angle θe at the position in which the AC motor 2 is stopped and the current command phase φ. Here, the current is "zero" is not limited to a case in which the current is strict 0 [A] but includes a case in which the current is a value in the substantially same range as 0 [A] in consideration of the sensing error and the resolution of a machine.

For example, in a one-phase control according to the patent document 1 (JP-A No. 2004-159391), when it is assumed that the sensor phase is the U phase, a current amplitude (Ia) is calculated by dividing a current sensor value (Iu) of the U phase by "a U phase current reference angle (θ'), which is generated from a current command phase angle acquired from the dq axis current commands and an electric angle", and the current estimated values Iv, Iw of the other two phases are calculated by multiplying a sine value at an electric angle, which is shifted from the U phase current reference angle (θ') by ±120[°], by the current amplitude (Ia) (equations 2.1 to 2.3)

$$Ia = Iu/[\sqrt{(1/3)} \times (\{-\sin(\theta')\})] \quad (2.1)$$

$$Iv = \sqrt{(1/3)} \times Ia \times (\{-\sin(\theta'+120[°])\}) \quad (2.2)$$

$$Iw = \sqrt{(1/3)} \times Ia \times (\{-\sin(\theta'+240[°])\}) \quad (2.3)$$

In this method, when the AC motor 2 is stopped at the position in which the current sensor value (Iu) of the sensor phase becomes 0 [A], the current amplitude (Ia) becomes zero and the current estimated values of the other two phases are estimated to be zero. Hence, even when the current concentration is caused in either of the other two phases, it cannot be determined that the current concentration is caused.

Further, in a one-phase control according to JP-A No. 2008-86139, of the three phase current command values obtained by inversely dq transforming the dq axis current commands, the current command values of two phases other than the sensor phase are treated as current estimated values and a current feedback control is performed.

When the current sensed value of the sensor phase becomes zero in this technique, the dq axis current estimated values, which are obtained by dq transforming the value of zero that is the sensor value of the one phase and the current estimated values of the other two phases, correspond to the dq axis current commands. Hence, the dq axis current commands result in being fed back to the dq axis current commands as they are, which brings about the same state as a state in which the feedback control is not performed. In other words, the current values of the other two phases are determined by the current commands and the information of actual currents are not reflected, so that not only the drive control of the AC motor 2 is made unstable but also a false determination is likely to be made.

[Construction of the Control Section and Operation and Effect Thereof]

Figure 8:
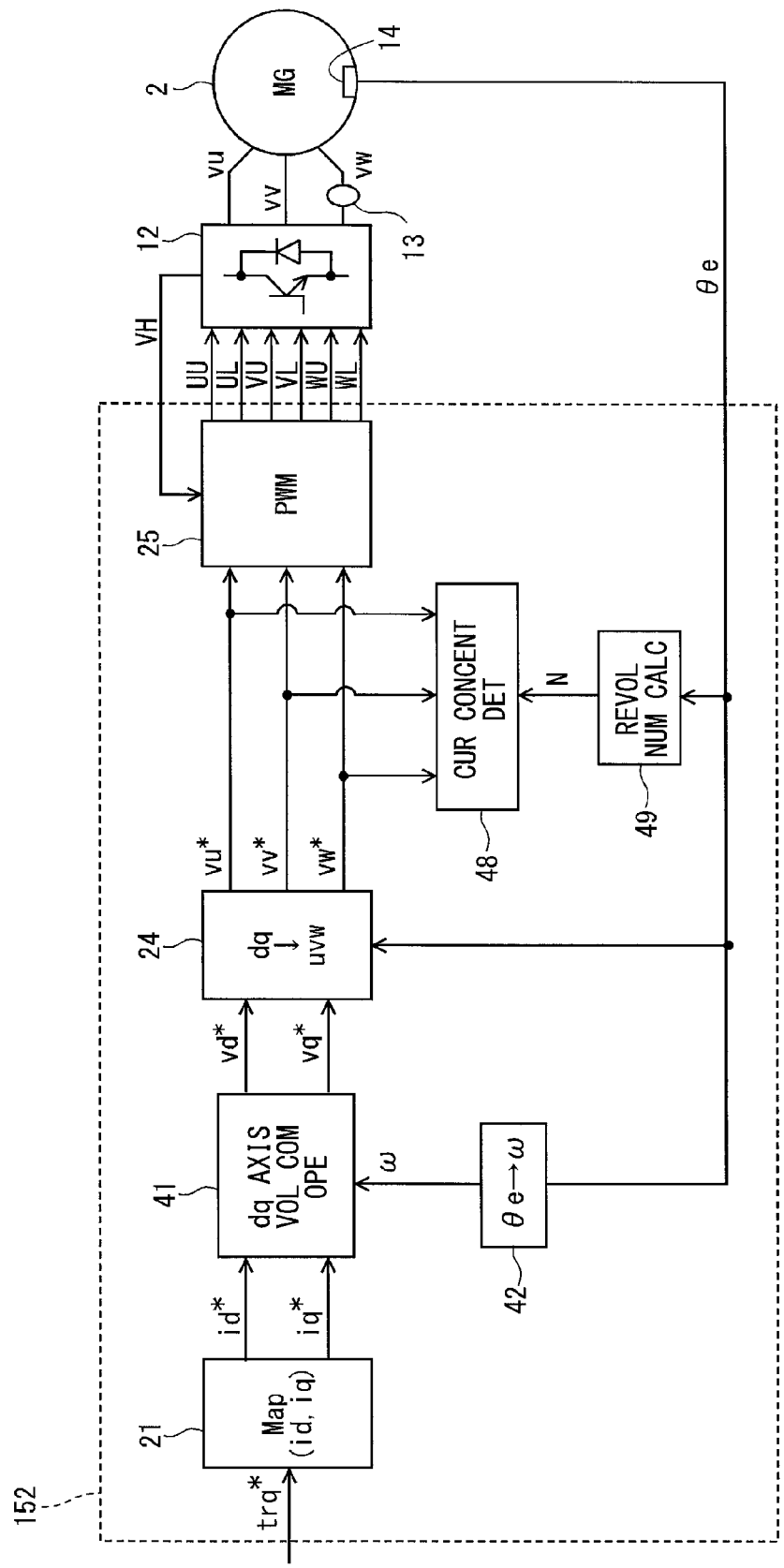
FIG. 8 is a block diagram to show a construction of a control section of the control device of the AC motor according to the second embodiment of the present disclosure.

Hence, the electric motor control device 10 according to the embodiment of the present disclosure is characterized by the construction of the control section 15 for making it possible to determine whether or not a current concentration is caused when the number of revolutions N of the AC motor 2 is not more than a given number of revolutions. Hereinafter, the construction of the control section 15 and the operation and effect thereof will be described for each of a first embodiment and a second embodiment. Reference characters of the control sections of the first embodiment and the second embodiment are made 151 (FIG. 5) and 152 (FIG. 8).

First Embodiment

The construction of the control section 151 of the first embodiment will be described with reference to FIG. 5 to FIG. 7.

Figure 5:
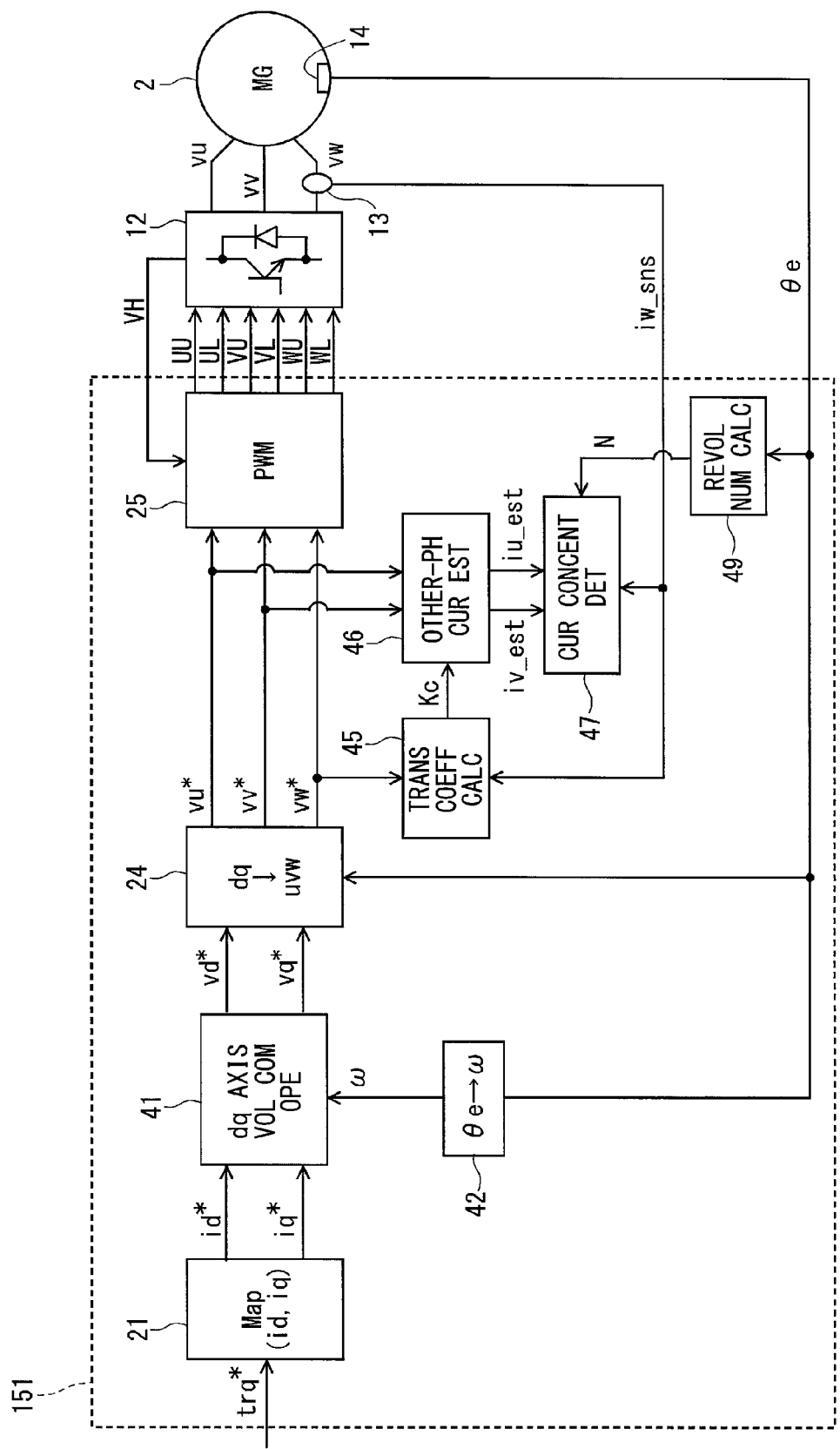
FIG. 5 is a block diagram to show a construction of a control section of the control device of the AC motor according to the first embodiment of the present disclosure.

As shown in FIG. 5, the control section 151 includes a current command operation part 21, a dq axis voltage command operation part 41, an angular velocity calculation part 42, an inverse dq transformation part 24, a PWM signal generation part 25, a transformation coefficient calculation part 45, an other phase current estimation part 46, a current concentration determination part 47, and a number-of-revolutions calculation part 49.

The dq axis voltage command operation part 41 and the inverse dq transformation part 24 construct "a three phase voltage command operation device." Further, the transformation coefficient calculation part 45, the other phase current estimation part 46, and the current concentration determination part 47 construct "a transformation coefficient calculation device", "an other phase current estimation device", and "a current concentration determination device", respectively.

The current command operation part 21 operates a d axis current command id* and a q axis current command iq* on a rotating coordinate system (d-q coordinate system) of the AC motor 2 on the basis of the torque command value trq* acquired from the vehicle control circuit 9. Hereinafter, "a d axis current and a q axis current" are expressed by "dq axis currents".

In the present embodiment, the dq axis current commands id*, iq* are operated with reference to a map stored in advance, but in the other embodiment, the dq axis current commands id*, iq* may be operated by a mathematical formula or the like.

The dq axis voltage command operation part 41 operates the dq axis voltage commands vd*, vq* by the use of a voltage equation. First, the voltage equation of an electric motor is generally expressed by equations (3.1) and (3.2).

$$vd = Ra \times id + Ld \times (d/dt)id - \omega \times Lq \times iq \quad (3.1)$$

$$vq = Ra \times iq + Lq \times (d/dt)iq + \omega \times Lq \times id + \omega \times \psi \quad (3.2)$$

The reference characters are as follows.

Ra: armature resistance
Ld, Lq: d axis self-inductance, q axis self-inductance
ω: electric angular velocity
ψ: armature interlinkage flux of permanent magnet Here, the armature resistance Ra, the d axis self-inductance Ld and the q axis self-inductance Lq, and the armature interlinkage flux ψ, which are machine constants of the AC motor 2, may be set at fixed values or may be calculated by calculation. Further, values close to actual characteristics and actual measured values of the machine constants may be stored in a map and the machine constants may be operated on the basis of the torque command value trq* or the d axis current command value id* and the q axis current command value iq*.

Further, when a time differential term (d/dt) expressing a transient property is neglected and the dq axis voltage commands vd*, vq* are used as dq axis voltages and the dq axis current commands id*, iq* are used as dq axis currents, the equations (3.1), (3.2) are rewritten by (4.1), (4.2).

$$vd^* = Ra \times id^* - \omega \times Lq \times iq^* \quad (4.1)$$

$$vq^* = Ra \times iq^* + \omega \times Ld \times id^* + \omega \times \psi \quad (4.2)$$

The dq axis voltage command operation part 41 operates the dq axis voltage commands vd*, vq* by the use of the equations (4.1), (4.2). This operation is referred to as "a feed-forward voltage command operation". The angular velocity calculation part 42 converts the electric angle θe to an electric angular velocity ω and outputs the electric angular velocity ω to the dq axis voltage command operation part 41.

Further, it is when the AC motor 2 is close to be stopped, that is, when ω≅0 [rad/s] that a current concentration determination is required. When it is assumed in the equations (4.1), (4.2) that ω=0, only the term of the armature resistance Ra remains as shown by the equations (4.3), (4.4). For this reason, the d axis voltage command vd* is determined only by the d axis current command value id* and the q axis voltage command vq* is determined only by the q axis current command value iq*.

$$vd^* = Ra \times id^* \quad (4.3)$$

$$vq^* = Ra \times iq^* \quad (4.4)$$

In this way, the dq axis voltage commands vd*, vq* operated by the dq axis voltage command operation part 41 are outputted to the inverse dq transformation part 24.

The inverse dq transformation part 24 transforms the dq axis voltage commands vd*, vq* to a U phase voltage command vu*, a V phase voltage command vv*, and a W phase voltage command vw* on the basis of the electric angle θe acquired from the rotation angle sensor 14.

When ω≅0 [rad/s], from the equations (4.3), (4.4), the dq axis voltage commands vd*, vq* are a constant (Ra) times the dq axis current commands id*, iq*, respectively. Hence, the relationships of equations (5.1), (5.2), (5.3) hold true between three phase voltage commands vu*, vv*, vw* after the inverse dq transformation and the phase currents iu, iv, iw.

$$vu^* = Ra \times iu \quad (5.1)$$

$$vv^* = Ra \times iv \quad (5.2)$$

$$vw^* = Ra \times iw \quad (5.3)$$

The PWM signal generation part 25 calculates the PWM signals UU, UL, VU, VL, WU, WL relating to the switching on and off of the switching elements of the inverter 12 on the basis of the three phase voltage commands vu*, vv*, vw* and an inverter input voltage VH to be impressed on the inverter 12.

Here, when the voltage commands vu*, vv*, vw* obtained from the theoretical equations (5.1) to (5.3) are used, without any change, as the three phase voltage commands to be used for the calculation of the PWM signals UU, UL, VU, VL, WU, WL, there is a possibility that the three phase voltage commands vu*, vv*, vw* are different from the voltage commands that generate torque corresponding to a command and hence the drive control of the AC motor 2 is likely to be made unstable. Hence, three phase voltage commands obtained by adding appropriate corrections to the values calculated from the theoretical equations (5.1) to (5.3) may be used as the three phase voltage commands to be used for the calculation of the PWM signals UU, UL, VU, VL, WU, WL. In addition, the three phase voltage commands vu*, vv*, vw* may be calculated by the use of the dq axis voltage commands vd*, vq* obtained by adding appropriate corrections to the values calculated from the theoretical equations (4.3), (4.4) of the dq axis voltage commands. In this way, a correction method and an object to be corrected are not limited to a specific method and a specific object.

When the switching elements of the inverter 12 are switched on and off on the basis of the PWM signals UU, UL, VU, VL, WU, WL, the three phase AC voltages vu, vv, vw are generated. Then, when the three phase AC voltages vu, vv, vw are impressed on the AC motor 2, the drive of the AC motor 2 is controlled in such a way that torque corresponding to the torque command value trq* is outputted.

The transformation coefficient calculation part 45 acquires the voltage command vw* of the W phase that is the sensor phase and the current sensed value iw_sns and calculates a transformation coefficient Kc that is the ratio of these values by an equation (6).

$$Kc = vw^* / iw\_sns \quad (6)$$

The equation (5.3) and a voltage error caused by physical factors relating to the AC motor 2 and the electric motor control device and coefficients required for an operation process are replaced as a whole by K. This value of K will be changed in consideration of errors to be caused. As described above, even when the three phase voltage commands calculated by the theoretical equations (5.1) to (5.3) are further corrected, it is assumed that the value of K is further appropriately changed as a buffer in calculation.

Since "Kc=K×Ra", the equations (5.1), (5.2) can be rewritten by equations (7.1), (7.2).

$$iu\_est = vu^* / Kc \quad (7.1)$$

$$iv\_est = vv^* / Kc \quad (7.2)$$

The transformation coefficient Kc is a transformation coefficient for estimating phase currents iu_est, iv_est from the voltage commands vu*, w* of the U phase and the V phase when ω≅0 [rad/s].

The other phase current estimation part 46 acquires the voltage commands vu*, vv* of the U phase and the V phase, which are the two phases other than the sensor phase, and calculates current estimated values iu_est, iv_est of the U phase and the V phase by the use of the transformation coefficient Kc from the equations (7.1), (7.2) and outputs the current estimated values iu_est, iv_est of the U phase and the V phase to the current concentration determination part 47.

When the number of revolutions N obtained by converting the electric angle θe by the number-of-revolutions calculation part 49 is not more than a given number of revolutions, the current concentration determination part 47 acquires the current sensed value iw_sns of the sensor phase and the current estimate values iu_est, iv_est of the other two phases and makes a current concentration determination. This current concentration determination, as shown in FIG. 6, is made by comparing the current values of three phases with plus and minus current determination threshold values Ijth$^+$, Ijth$^-$.

Figure 6:
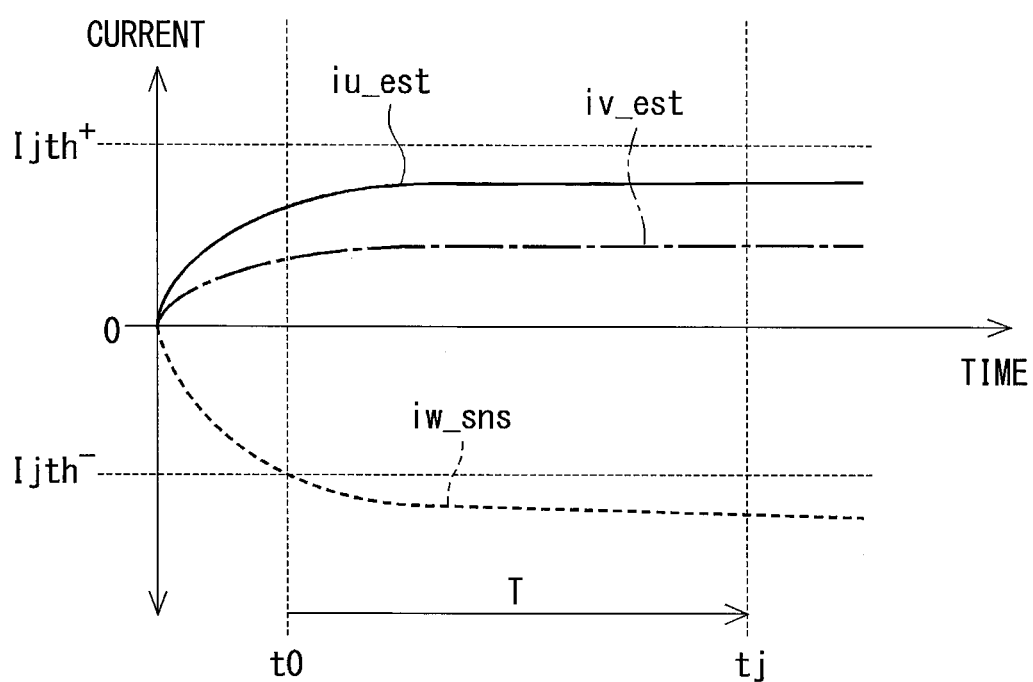
FIG. 6 is a time chart of current concentration determination processing according to the first embodiment of the present disclosure.
Figure 7:
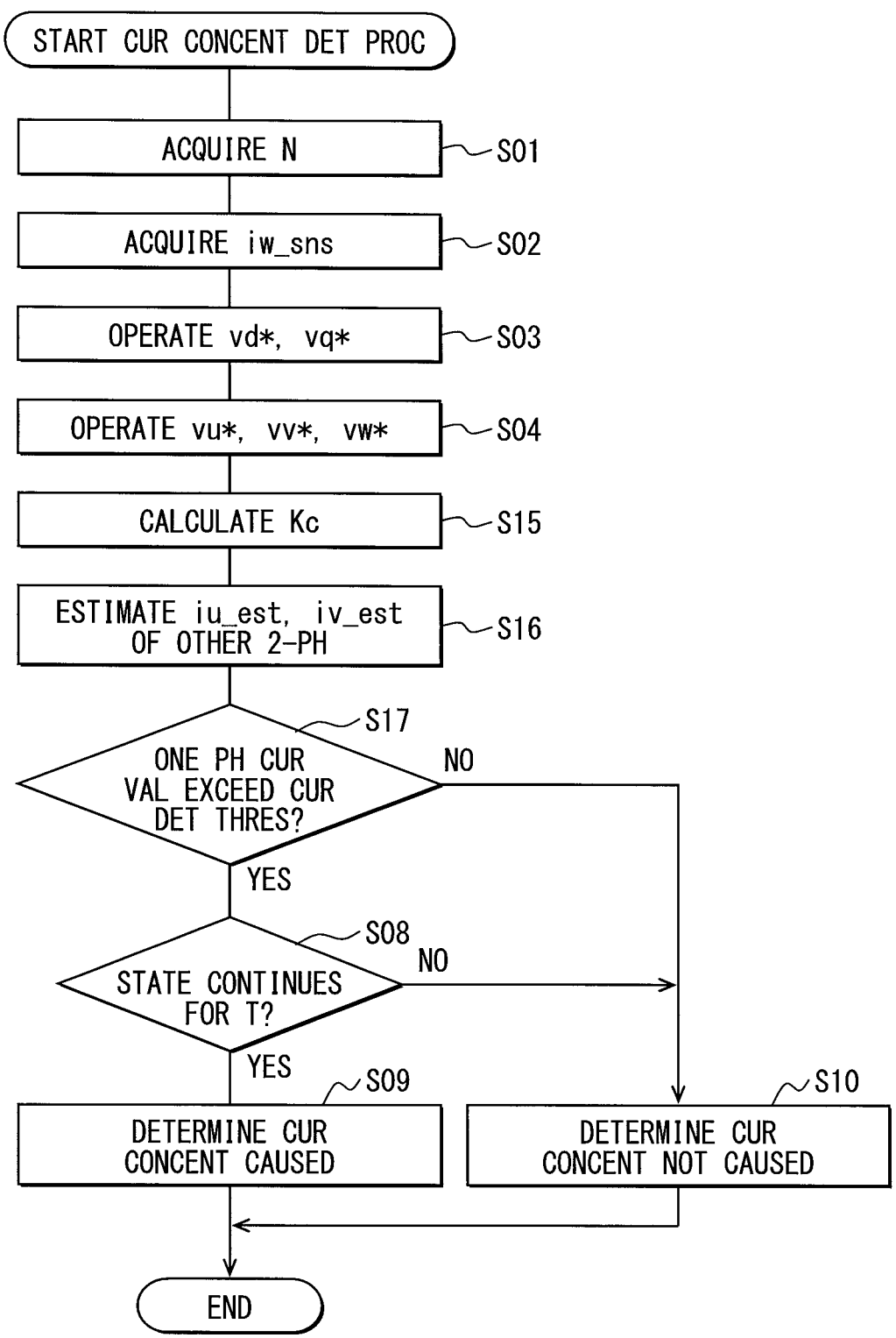
FIG. 7 is a flow chart of the current concentration determination processing according to the first embodiment of the present disclosure.

In FIG. 6, the current sensed value iw_sns of the W phase gradually decreases from an initial value of 0 and becomes less than the minus current determination threshold value Ijth$^-$. In this way, a timing when a current value of any one phase is more than the plus current determination threshold value Ijth$^+$ or is less than the minus current determination threshold value Ijth$^-$ is set as a time t0 and a determination period of time T is clocked.

A state in which the current sensed value iw_sns of the W phase is less than the minus current determination threshold value Ijth$^-$ continues after the time t0. At a time tj when a given determination period of time T passes from the time t0 with this state continuously held, the current concentration determination part 47 determines that the current is concentrated in the W phase.

Here, the current determination threshold values Ijth$^+$, Ijth$^-$ and the determination period of time T may be set at as large values as can avoid the failure of the switching elements in consideration of the specifications and the safety factor of the switching elements of the inverter 12. Further, as to the comparison of the current value and the current determination threshold value, the absolute value of the current value may be compared with the absolute value of the current determination threshold value.

Further, the current estimated values iu_est, iv_est estimated in the current concentration determination processing of the present embodiment are used only for the determination of the current concentration and are not used for the current estimated values for control, so that the current estimated values iu_est, iv_est are not required of high accuracy. Hence, it is preferable that the current determination threshold values Ijth$^+$, Ijth$^-$ are set on the assumption that there is a variation in the current estimated values.

Next, the current concentration processing performed by the control section 151 will be described with reference to a flow chart shown in FIG. 7. In the following description of the flow chart, a character "S" means a step.

In S01, the number of revolutions N is acquired on the basis of the electric angle θe acquired from the rotation angle sensor 14. Then, it is checked that the number of revolutions N, which is acquired, is not more than a given number of revolutions for which the current concentration determination processing is required.

In S02, the current sensed value iw_sns of the sensor phase is acquired from the current sensor 13.

In S03, the dq axis voltage command operation part 41 operates the dq axis voltage commands vd*, vq* by the use of the voltage equation on the basis of the dq axis current commands id*, iq* and the electric angular velocity w converted from the electric angle θe.

In S04, the inverse dq transformation part 24 transforms the dq axis voltage commands vd*, vq* to the three phase voltage commands vu*, vv*, vw*.

In S15, the transformation coefficient calculation part 45 calculates the transformation coefficient Kc from the ratio of the voltage command vw* that is the W phase to the current sensed value iw_sns. Here, the transformation coefficient Kc is obtained from an equation of Kc=vw*/iw_sns.

In S16, the other phase current estimation part 46 calculates the current estimated values iu_est, iv_est from the voltage commands vu*, vv* of the other two phases by the use of the transformation coefficient Kc and outputs the current estimated values iu_est, iv_est to the current concentration determination part 47.

In S17, the current concentration determination part 47 determines whether or not any one of the phase current values of the current sensed value iw_sns of the W phase and the current estimated values iu_est, iv_est of the other two phases becomes more than the current determination threshold value.

When any one of the phase current values becomes more than the current determination threshold value (S17: YES), it is determined in S08 whether or not the state in which any one of the phase current values is more than the current determination threshold value continues for a given determination period of time T. When the state in which any one of phase current values is more than the current determination threshold value continues for the given determination period of time T (S08: YES), it is determined that the current concentration is caused in the phase (S09).

On the other hand, when the determination in S17 is NO or the determination in S08 is NO, it is determined that the current concentration is not caused in any phase (S10).

Up to this, the current concentration determination processing by the control section 151 is finished.

Here, when the current concentration is caused, it can be considered that the state of the current concentration is released, for example, by taking the following measures.

(a) By applying torque to the AC motor 2, the AC motor 2 is further rotated. When the number of revolutions N is not less than a given number of revolutions, the phase current is temporally varied at a frequency more than a given frequency, which hence makes it possible to avoid a state in which current is concentrated in a specific phase for a given period of time or more.

(b) In an electric motor control device applied to a vehicle, the AC motor 2 may be rotated, for example, by making the vehicle slide down by reducing torque from a state in which the torque balances with gravity when the vehicle climbs up a slope. Alternatively, there is also a case in which the torque command value trq* is reduced to thereby reduce the dq axis current commands id*, iq*, which results in making the absolute value of the phase current not more than the current determination threshold value.

(c) When the phase current is increased by the temperature characteristics of the armature resistance Ra or the like or by an overload state, the electric motor control device 10 is more cooled.

The operation and effect of the electric motor control device of the present embodiment will be described.

(1) When the number of revolutions N of the AC motor 2 is not more than a given number of revolutions, which is close to a state in which the AC motor 2 is stopped, and the phase current is made a direct current and the current sensed value iw_sns of the sensor phase becomes zero according to the electric angle θe at the position in which the AC motor 2 is stopped and the current command phase φ, in the one-phase control of the related art, the current estimated values of the other two phases other than the sensor phase cannot be appropriately estimated. For this reason, even when the current concentration is caused in the other two phases other than the sensor phase, the current concentration cannot be determined.

On the other hand, when the number of revolutions N of the AC motor 2 is not more than the given number of revolutions, the current concentration determination part 47 can appropriately determine whether or not the current concentration is caused in the respective phases on the basis of the three phase voltage commands vu*, vv*, vw* operated by the dq axis voltage command operation part 41 and the inverse dq transformation part 24.

When it is determined that the current concentration is caused, it is possible to prevent the switching elements and the like of the inverter 12 from being brought into the state of overloaded by taking appropriate measures for relieving the current concentration.

(2) The control section 151 of the present embodiment includes the transformation coefficient calculation part 45 and the other phase current estimation part 46 and calculates the current estimated values iu_est, iv_est of the other two phases by the use of the transformation coefficient Kc that is the value or ratio of the voltage command vw* of the sensor phase to the current sensed value iw_sns. Then, the current concentration determination part 47 determines whether or not the current concentration is caused in the other two phases on the basis of the current estimated values iu_est, iv_est.

There is a case in which the voltage command based on the theoretical equations (5.1) to (5.3) is made different from a voltage command for voltage to be impressed on the AC motor 2 so as to generate torque according to the command by the physical factors relating to the AC motor and the control device of the AC motor such as a voltage error caused by a dead time or the like and the temperature characteristics of the armature resistance Ra. Hence, by employing the construction of estimating the currents of the other phases of the sensor phase by the use of the transformation coefficient Kc, the accuracy of the determination of whether or not the current concentration is caused in the other two phases can be improved.

(3) The dq axis voltage command operation part 41 operates the dq axis voltage commands vd*, vq* from the dq axis current commands id*, iq* by a feed-forward voltage command operation using the voltage equations. In this way, even in the state in which the AC motor is stopped or in the low rotation range, that is, in which since actual machine information is scarce, the feedback control is difficult in the one-phase control, the three phase voltage commands vu*, vv*, vw* can be appropriately operated.

Second Embodiment

Next, an electric motor control device of a second embodiment of the present disclosure will be described with reference to FIG. 8 to FIG. 10. The second embodiment is different from the first embodiment in a construction relating to the current concentration determination.

In the descriptions of the block diagram and the flow chart in the following, the substantially same constructions and the substantially same steps as the first embodiment will be denoted by the same reference characters and by the same step numbers and their descriptions will be omitted. Points different from the first embodiment will be described in detail.

As shown in FIG. 8, a control section 152 of the electric motor control device of the second embodiment includes a current concentration determination part 48 as "a current concentration determination device" in place of the transformation coefficient calculation part 45, the other phase current estimation part 46, and the current concentration determination part 47 of the first embodiment.

When the number of revolutions N obtained by converting the electric angle θe by the number-of-revolutions calculation part 49 is not more than a given number of revolutions, the current concentration determination part 48 acquires the three phase voltage commands vu*, vv*, vw* outputted by the inverse transformation part 24 and makes the current concentration determination for these three phase voltage commands. This current concentration determination, as shown in FIG. 9, is made by comparing the three phase voltage commands vu*, vv*, vw* with the plus and minus voltage determination threshold values $Vjth^+$, $Vjth^-$.

According to the equations (5.1) to (5.3), the three phase current iu, iv, iw are determined by the three phase voltage commands vu*, vv*, vw*. Hence, the current concentration may be determined directly from the three phase voltage commands vu*, vv*, vw*.

Figure 9:
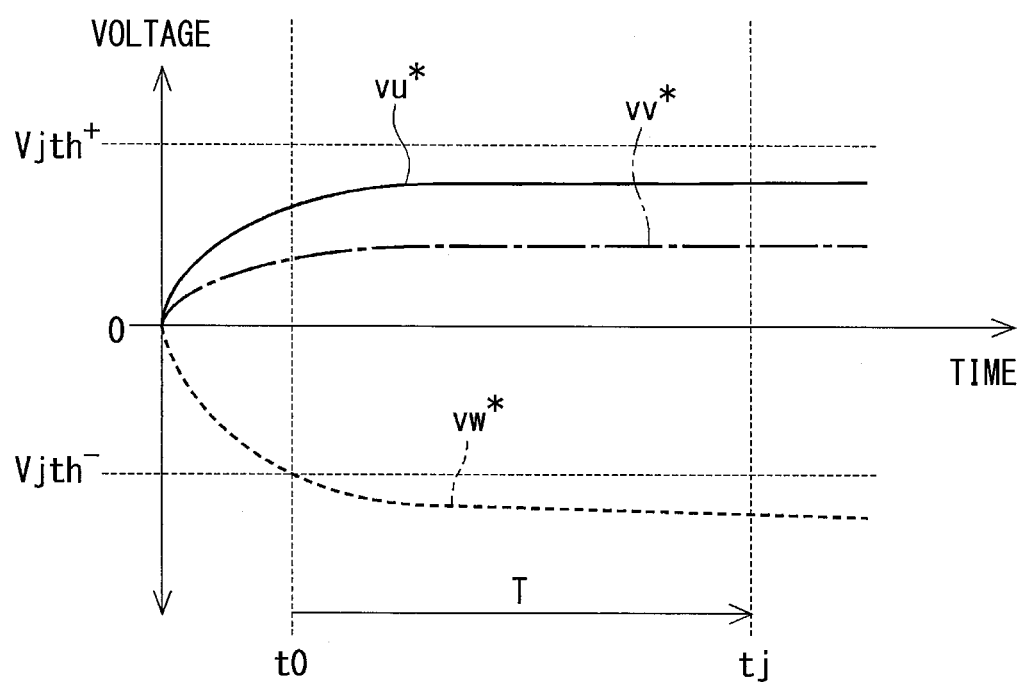
FIG. 9 is a time chart of current concentration determination processing according to the second embodiment of the present disclosure.

In FIG. 9, the voltage command vw* of the W phase decreases gradually from an initial value of 0 and is less than the minus voltage determination threshold value $Vjth^-$. In this way, a timing when a voltage value of any one phase is more than the plus voltage determination threshold value $Vjth^+$ or is less than the minus voltage determination threshold value $Vjth^-$ is set as a time t0 and a determination period of time T is clocked.

A state in which the voltage sensed value vw* of the W phase is less than the minus voltage determination threshold value $Vjth^-$ continues after the time t0. When the given determination period of time T passes from the time t0 with this state continuously held, the current concentration determination part 48 determines that the current is concentrated in the W phase.

Here, the voltage determination threshold values $Vjth^+$, $Vjth^-$ and the determination period of time T may be set at as large values as can avoid the failure of the switching elements in consideration of the specifications and the safety factor of the switching elements of the inverter 12. Further, as to the comparison of the voltage command and the voltage determination threshold value, the absolute value of the voltage command may be compared with the absolute value of the voltage determination threshold value.

Figure 10:
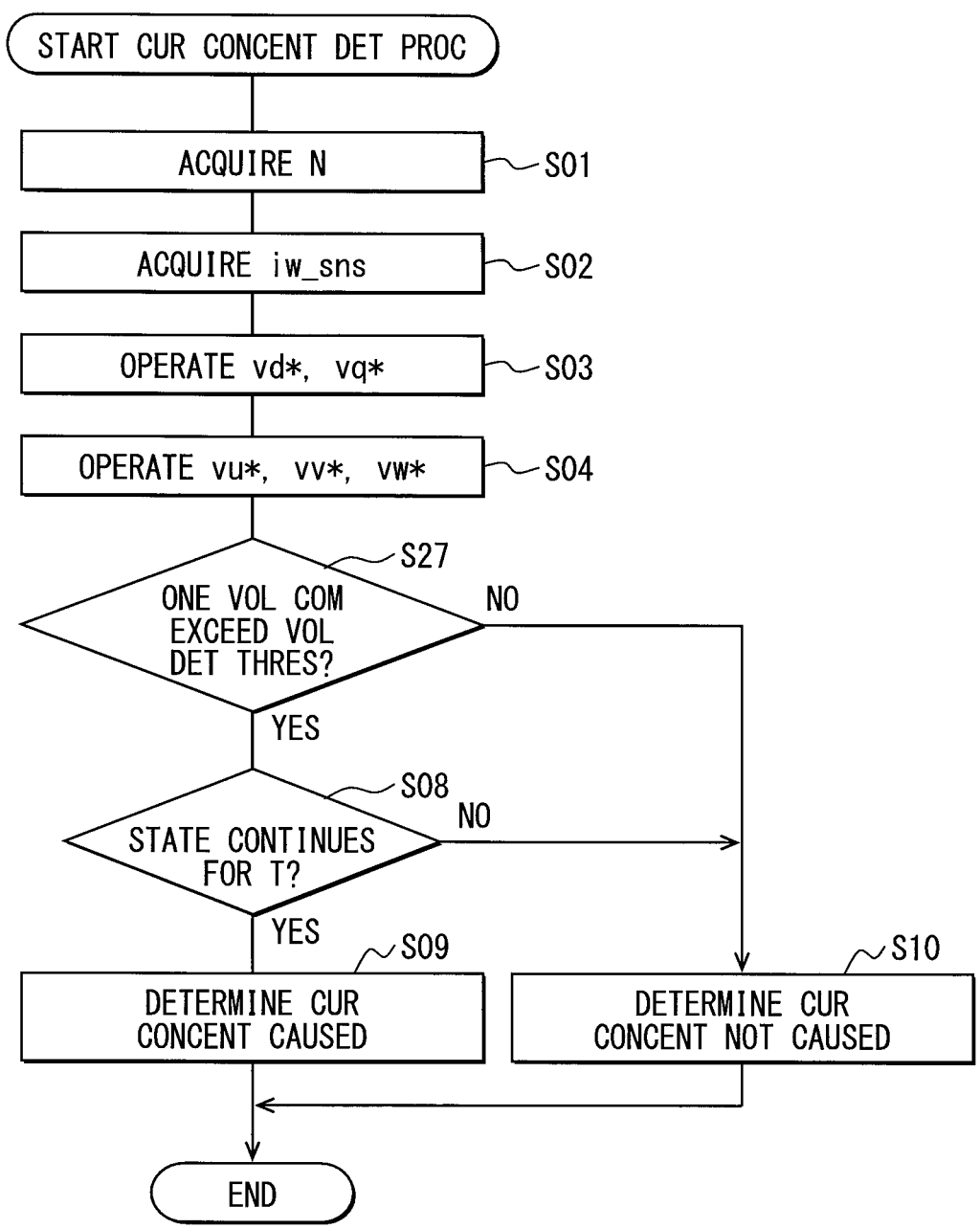
FIG. 10 is a flow chart of the current concentration determination processing according to the second embodiment of the present disclosure.

A flow chart of current concentration determination processing performed by the control section 152 shown in FIG. 10 is different from the flow chart (FIG. 7) of the first embodiment in that S15 and S16 are omitted and that S27 is provided in place of S17.

In S27, the current concentration determination part 48 determines whether or not the voltage command of any one phase of the voltage commands vu*, vv*, vw* of the three phases is more than the voltage determination threshold value.

When the voltage command of any one phase of the voltage commands vu*, vv*, vw* of the three phases is more than the voltage determination threshold value (S27: YES), it is determined in S08 whether or not a state in which the voltage command of any one phase of the voltage commands vu*, vv*, vw* of the three phases is more than the voltage determination threshold value continues for the given determination period of time T. Then, when the state in which the voltage command of any one phase is more than the voltage determination threshold value continues for the given determination period of time T (S08: YES), it is determined that the current concentration is caused in the phase (S09).

The other steps are the same as the first embodiment.

In the second embodiment, the current concentration is determined directly from the three phase voltage commands vu*, vv*, vw*, so that the construction of the control section 152 can be made simpler than the first embodiment.

The second embodiment can be effectively applied, in particular, to the case in which the electric angular velocity ω is 0 [rad/s] and the voltage error caused by the dead time and in which the temperature characteristics of the armature resistance Ra can be neglected in the application of the theoretical equations (5.1) to (5.3) relating to the relationship between the voltage command and the phase current.

Other Embodiments (A) The sensor phase for sensing the phase current by the current sensor is not limited to the W phase of the embodiments described above but may be the U phase or the V phase. Further, the base of the electric angle $\theta e$ on the three phase coordinates may be an axis of a phase other than the U phase axis.

(B) In the embodiments described above, the relationship between the dq axis current commands id*, iq* and the dq axis voltage commands vd*, vq* is determined by the voltage equations. In the other embodiment, a map of the dq axis voltage commands to the dq axis current commands may be made and the relationship between the dq axis current commands id*, iq* and the dq axis voltage commands vd*, vq* may be determined with reference to this map.

(C) In the first embodiment, except the case in which the dq axis current command id*, iq* themselves are zero, it is preferable that the current sensed value iw_sns of the sensor phase is always sensed to be not zero irrespective of the electric angle $\theta e$ at the position in which the AC motor 2 is stopped and the current command phase $\phi$. For this reason, the control section may include a construction in which when the current sensed value iw_sns of the sensor phase is sensed to be zero, the control section operates the electric angle $\theta e$ or the current command phase $\phi$ to thereby make the current sensed value iw_sns not zero.

(D) The rotation angle sensor is not limited to a mode for sensing the electric angle $\theta e$ and outputting the electric angle $\theta e$ to the control section, but may sense a rotor rotation angle (mechanical angle) $\theta m$ and may output the rotor rotation angle $\theta m$ to the control section and the rotor rotation angle $\theta m$ may be converted to the electric angle $\theta e$ in the control section. Further, the number of revolutions N may be calculated on the basis of the mechanical angle $\theta m$.

(E) In the embodiments described above has been described the example in which "the current sensor for control" for sensing current used for the control is provided in one phase. In the other embodiment, in addition to the current sensor for control, an independent "current sensor for monitoring" for monitoring an abnormality of the current sensor for control may be provided in the sensor phase or a phase other than the senor phase. As an example, a one-phase two-channel construction in which the current sensor for control and the current sensor for monitoring are provided in one phase and a two-phase one-channel construction in which the current sensor for control is provided in one phase and in which the current sensor for monitoring is provided in any one phase other than the one phase may be employed. In either of the constructions, any number of current sensors may be in any phase.

(F) In the embodiments described above, the AC motor is the three phase AC motor of the permanent magnet synchronous type. In the other embodiment, the AC motor may be an induction motor or the other synchronous motor. Further, each of the AC motors of the embodiments described above is the so-called motor generator having both of the function as the electric motor and the function as the generator. In the other embodiment, the AC motor may be an electric motor not having the function as the generator.

The AC motor may be so constructed as to operate as an electric motor for an engine and to start the engine. Further, the engine may not be provided. Still further, a plurality of AC motors may be provided and a power dividing mechanism for dividing the power of the plurality of AC motors may further be provided.

(G) Further, the control device of the AC motor according to the present disclosure may be applied not only to the system having one set of the inverter and the AC motor, as described in the above embodiments, but also to a system having two or more sets of the inverter and the AC motor. Further, the control device of the AC motor according to the present disclosure may be applied to a system of an electric train or the like having a plurality of AC motors connected in parallel to one inverter.

(H) A control device of an AC motor according to the present disclosure is not limitedly applied to the AC motor of the hybrid automobile having the construction shown in FIG. 1 but may be applied to an AC motor of an electric vehicle having any construction. Further, the control device of an AC motor according to the present disclosure may be applied to an AC motor other than the electric vehicle.

The above disclosure has the following aspects.

According to an aspect of the present disclosure, a control device of a three phase alternating current motor includes: an inverter for driving the motor; a current sensor for sensing current flowing in a sensor phase of the motor, which is one of three phases of the motor; and a controller for switching on and off a plurality of switching elements, which provide the inverter, so that the controller controls the current flowing through the motor. The controller includes: a revolution number calculation device for calculating the number of revolutions of the motor; a three-phase voltage command operation device for operating three voltage commands for three phase voltages of the three phases to be applied to the motor based on a current command and an electric angle; and a current concentration determination device for determining whether a current concentration is caused based on the three voltage commands when the number of revolutions acquired by the revolution number calculation device is not more than a predetermined number of revolutions. The current concentration is a state, in which current not less than a predetermined threshold value flows continuously for a predetermined period in one or more phases of the inverter.

When the number of revolutions of the AC motor is zero, or not more than a given number of revolutions, that is, close to zero and the phase current is made a direct current, in the one-phase control of the related art, the current estimated values of the other two phases other than the sensor phase cannot be appropriately estimated and hence the drive control of the AC motor is likely to be made unstable. In addition, when the current sensed value of the sensor phase becomes zero according to the electric angle at the position in which the AC motor is stopped and the current command phase, even when a current concentration is caused in any one phase of the other two phases, it cannot be determined that the current concentration is caused.

In contrast to this, according to the above control device, when the number of revolutions is not more than the given number of revolutions, whether or not a current concentration is caused in each phase can be appropriately determined by the current concentration determination device on the basis of the three phase voltage commands operated by the three phase voltage command operation device.

Alternatively, the controller may further include: a transformation coefficient calculation device for calculating a transformation coefficient according to a ratio of a voltage command of the sensor phase to a current sensed value of the sensor phase; and an other-phase current estimation device for calculating two current estimated values of two phases other than the sensor phase using the transformation coefficient based on two voltage commands of the two phases other than the voltage command of the sensor phase. When a state, in which at least one of the current sensed value of the sensor phase and the two current estimated values of the two phases is more than a predetermined current determination threshold value, continues for a predetermined determination period, the current concentration determination device determines that the current concentration is caused.

Alternatively, when a state, in which at least one of the three voltage commands of the three phases is more than a predetermined voltage determination threshold value, continues for a predetermined determination period, the current concentration determination device may determine that the current concentration is caused.

When it is determined in the above ways that the current concentration is caused, for example, by taking appropriate measures of releasing the current concentration such as limiting an upper value of a torque command or a current command, it is possible to prevent the switching elements of the inverter from being brought into an overload state.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three phase alternating current motor comprising:
    an inverter for driving the motor;
    a current sensor for sensing current flowing in a sensor phase of the motor, which is one of three phases of the motor; and
    a controller for switching on and off a plurality of switching elements, which provide the inverter, so that the controller controls the current flowing through the motor,
    wherein the controller includes:
        a revolution number calculation device for calculating the number of revolutions of the motor;
        a three-phase voltage command operation device for operating three voltage commands for three phase voltages of the three phases to be applied to the motor based on a current command and an electric angle; and
        a current concentration determination device for determining whether a current concentration is caused based on the three voltage commands when the number of revolutions acquired by the revolution number calculation device is not more than a predetermined number of revolutions, and
    wherein the current concentration is a state, in which current not less than a predetermined threshold value flows continuously for a predetermined period in one or more phases of the inverter, and
    wherein the controller further includes:
        a transformation coefficient calculation device for calculating a transformation coefficient according to a ratio of a voltage command of the sensor phase to a current sensed value of the sensor phase; and
        an other-phase current estimation device for calculating two current estimated values of two phases other than the sensor phase using the transformation coefficient based on two voltage commands of the two phases other than the voltage command of the sensor phase, and
    wherein, when a state, in which at least one of the current sensed value of the sensor phase and the two current estimated values of the two phases is more than a predetermined current determination threshold value, continues for a predetermined determination period, the current concentration determination device determines that the current concentration is caused.

* * * * *